US012602689B2

(12) United States Patent (10) Patent No.: US 12,602,689 B2
Gutzeit (45) Date of Patent: Apr. 14, 2026

(54) SYSTEM AND METHOD FOR CONFIRMING INSTRUCTIONS OVER A COMMUNICATION CHANNEL

(71) Applicant: LEAPXPERT LIMITED, Causeway Bay (HK)

(72) Inventor: Dmitry Gutzeit, Causeway Bay (HK)

(73) Assignee: LeapXpert Limited, Causeway Bay (HK)

( * ) Notice: Subject to any disclaimer, the term of this patent is extended or adjusted under 35 U.S.C. 154(b) by 1022 days.

(21) Appl. No.: 17/597,030

(22) PCT Filed: Jul. 9, 2019

(86) PCT No.: PCT/IB2019/055819
§ 371 (c)(1),
(2) Date: Dec. 22, 2021

(87) PCT Pub. No.: WO2020/012343
PCT Pub. Date: Jan. 16, 2020

(65) Prior Publication Data
US 2022/0300960 A1 Sep. 22, 2022

(30) Foreign Application Priority Data

Jul. 13, 2018 (HK) ................................. 18109100.8

(51) Int. Cl.
*G06Q 20/40* (2012.01)
*G06Q 20/32* (2012.01)
*G06Q 20/38* (2012.01)

(52) U.S. Cl.
CPC ..... *G06Q 20/4014* (2013.01); *G06Q 20/3223* (2013.01); *G06Q 20/3827* (2013.01); *G06Q 20/3829* (2013.01)

(58) Field of Classification Search
None
See application file for complete search history.

(56) References Cited

U.S. PATENT DOCUMENTS 8,831,979 B1 * 9/2014 Gerson ................... H04L 63/08
705/16
2003/0221125 A1 11/2003 Rolfe
(Continued)

FOREIGN PATENT DOCUMENTS

CN 1897027 A 1/2007
CN 101978652 A 2/2011
(Continued)

OTHER PUBLICATIONS

International Preliminary Report on Patentability issued on Jan. 19, 2021, for PCT Application No. PCT/IB2019/055819, filed on Jul. 19, 2019, 5 pages.
(Continued)

*Primary Examiner* — Patrick McAtee
*Assistant Examiner* — Jason B Fenstermacher
(74) *Attorney, Agent, or Firm* — MORRISON & FOERSTER LLP

(57) ABSTRACT

There is provided a method, system and computer readable medium for authorising a transaction over a communication channel. An association between at least one authentication factor for an entity and a specified communication channel having an endpoint accessible to the entity is stored. A message from a communications module of the computer system is sent over the specified communication channel to the endpoint including or updated with indicia indicating that authentication is required. Information for comparison with the at least one authentication factor for the entity associated with the specified communication channel is received at the computer system. The transaction is authorised if the stored at least one authentication factor for the entity associated with the specified communications channel matches the information provided from the endpoint.

26 Claims, 8 Drawing Sheets

(56) References Cited

U.S. PATENT DOCUMENTS

| | | | | |
|---|---|---|---|---|
| 2007/0107044 A1* | 5/2007 | Yuen | .................... | G06Q 20/425 |
| | | | | 726/2 |
| 2010/0274866 A1* | 10/2010 | Hammad | ............... | G06Q 40/12 |
| | | | | 709/207 |
| 2011/0035319 A1* | 2/2011 | Brand | .................... | G06Q 40/02 |
| | | | | 705/44 |
| 2012/0144461 A1* | 6/2012 | Rathbun | ............ | G06Q 20/4014 |
| | | | | 726/5 |
| 2012/0215658 A1* | 8/2012 | Estrada | .................. | G06Q 30/06 |
| | | | | 705/26.41 |
| 2014/0075515 A1 | 3/2014 | Mccolgan | | |
| 2017/0249638 A1* | 8/2017 | Mudaliar | ........... | G06Q 20/4012 |
| 2018/0114201 A1* | 4/2018 | Kadharmestan | ....... | G06Q 20/10 |
| 2018/0336543 A1* | 11/2018 | Van Os | ................ | G06Q 20/223 |

FOREIGN PATENT DOCUMENTS

| | | | |
|---|---|---|---|
| CN | 1022422318 | A | 4/2012 |
| CN | 104867012 | | 8/2015 |
| CN | 107533705 | A | 1/2018 |
| CN | 107925655 | A | 4/2018 |
| JP | 2013101463 | A | 5/2013 |
| WO | 2007044882 | A2 | 4/2007 |
| WO | 2010002596 | A2 | 1/2010 |
| WO | 2017023629 | A1 | 2/2017 |

OTHER PUBLICATIONS

International Search Report and Written Opinion mailed on Dec. 4, 2019, for PCT Application No. PCT/IB2019/055819, filed on Jul. 19, 2019, 7 pages.

* cited by examiner

SYSTEM AND METHOD FOR CONFIRMING INSTRUCTIONS OVER A COMMUNICATION CHANNEL

CROSS REFERENCE TO RELATED APPLICATIONS

This application is a national stage application under 35 U.S.C. § 371 of International Application No. PCT/IB2019/055819, filed internationally on Jul. 9, 2019, which claims the benefit of priority to Hong Kong Application No. 18109100.8, filed on Jul. 13, 2018.

FIELD

The present disclosure relates to system and method for confirming instructions over a communication channel.

BACKGROUND

Personal mobile communication devices are widespread in today's modern society both in the developed and developing parts of the world facilitating communication and commerce all around the world.

Typically, such personal communication devices provide multiple channels of communication for transmitting and receiving messages over a network, in addition to other communication channels such as email which can be utilised using such devices as well as laptop or desktop computers. The various communication channels may be operated on mobile as well as desktop computing environments.

With the wide selection of various applications executing on personal mobile communication devices there are many ways of interacting over a network with a remote server via an array of applications using various communication protocols, including via various instant messaging application such as WhatsApp, Facebook, Line, WeChat, IM+, Twitter.

In the context of conducting business using these communication channels, although the establishment of these channels may involve potentially onerous and detailed authentication techniques often performed by external out-of-band communication, such channels are vulnerable to identity theft/impersonation in ongoing communications, particularly if the device is a portable device which is misplaced or accessible to others for a period of time. Additionally with the fragmentation of conversations over numerous communication channels compliance and record keeping of instructions in a business context is difficult and unsuited to the rapid interchanges taking place. One technique often used is for confirmatory emails sent voluntarily between participants in the conversations, resulting in a (somewhat imperfect) record of the communication chain. However, it would be appreciated that in many settings, such as a private client advisory setting communicating investment decisions with clients and receiving communications from many different parties this is difficult to scale in a robust, accurate and timely manner.

Accordingly, an aspect of the present disclosure addresses or at least ameliorates at least some of the above disadvantages.

SUMMARY

In a first aspect, the present disclosure provides a method of authorising a transaction over a communication channel comprising:

storing in a computer system an association between at least one authentication factor for an entity and a specified communication channel having an endpoint accessible to the entity, sending a message from a communications module of the computer system over the specified communication channel to the endpoint, wherein the message includes or is updated to include indicia indicating authentication is required, receiving at the computer system information for comparison with the at least one authentication factor for the entity associated with the specified communication channel; and authorising the transaction by an authentication module at the computer system in response to determining that the stored at least one authentication factor for the entity associated with the specified communications channel matches the information provided from the endpoint.

Optionally, the access to the endpoint of the communication channel may be controlled so as to be accessible only by the entity.

The information provided by the endpoint for authorising the transaction may be received at the system over the specified communications channel.

The stored association between the authentication factor and a specified communications channel having an endpoint accessible to the entity may further include at least one further communications channel by which information for authorising the transaction will be received at the computer system from the endpoint.

The unique endpoint of the communication channel may be selected from the group comprising a telephone number, an email address, an instant messaging address, IMEI (International Mobile Equipment Identity) number, ESN (Electronic Serial Number), IP address (Internet Protocol) or MAC address (Medium Access Control), Universal Unique Identifier (UUID), Serial Identification Number.

The communications channel may be selected from the group comprising an email system, a messaging application, a Short Message Service application and a mobile telephone channel.

The indicia indicating that authentication is required may be configured such that upon actuation of the indicia, information for comparison with the at least one authentication factor for the entity associated with the specified communication channel is transmitted.

Indicia may be displayed on a message at the endpoint representative of successful authorisation, and may be a modified version of the indicia displayed on a message indicating authentication is required.

Messages transmitted on said communication channel and authentications thereof may be stored in an auditing module in communication with the authentication module of the computer system.

The messages stored in the auditing module may further include one or more of information for messages transmitted thereon selected from the group comprising time of transmission, time of receipt, identification of origin, identification of destination, and geographic location information.

A plurality of authentications may be performed with respect to the same transaction in accordance with predetermined criteria.

A plurality of authentications may be performed for the same transaction wherein the predetermined criteria are specified transaction limits.

The predetermined criteria may be specified at or before associating the at least one or more authentication factors with the communication channel.

Upon successful authentication, an instruction may be issued to a transaction processing module of another computer system, and upon a predetermined number of unsuccessful authentications, the transaction is marked as suspicious.

In a further aspect there is provided a system for authorising a transaction over a communication channel comprising:

a memory store of a computer system configured for storing an association between at least one authentication factor for an entity and a specified communication channel having an endpoint accessible to the entity, a communications module for sending a message over the specified communication channel to the endpoint, the message including or being updated to include indicia indicating that authentication is required, and for receiving information for comparison with the at least one authentication factor for the entity associated with the specified communication channel from the endpoint;

an authorisation module for verifying the transaction if the stored at least one authentication factor for the entity associated with the specified communications channel matches the information provided from the endpoint.

The access to the endpoint of the communication channel may be controlled so as to be accessible only to the entity.

The access to the endpoint of the communication channel is controlled so as to be accessible only to the entity.

The information provided by the endpoint for authorising the transaction may be received at the system over the specified communications channel.

The stored association between the authentication factor and a specified communications channel having an endpoint accessible to the entity may further include at least one further communications channel by which information for authorising the transaction will be received at the computer system from the endpoint.

The further communications channel by which information for authorising the transaction is received at the computer system from the endpoint may be associated with the authentication factor and a specified communications channel having an endpoint accessible to the entity.

The unique endpoint of the communication channel may be selected from the group comprising a telephone number, an email address, an instant messaging address, IMEI (International Mobile Equipment Identity) number, ESN (Electronic Serial Number), IP (Internet Protocol) address or MAC (Medium Access Control) address.

The communications channel may be selected from the group comprising an email system, a messaging application, a Short Message Service application and a mobile telephone channel.

The communications module may be configured to update the message to display indicia upon successful authorisation.

An auditing module may be in communication with the authentication module of the computer system and configured to store messages transmitted on said communication channel and authentications thereof.

The auditing module may be configured for storing information for messages transmitted on the communication channel wherein the information is selected from the group comprising time of transmission, time of receipt, identification of origin, identification of destination, and geographic location information.

The authentication module may perform a plurality of authentications with respect to the same transaction in accordance with predetermined criteria.

The authentication module may perform a plurality of authentications for the same transaction wherein the predetermined criteria are transaction limits.

The predetermined criteria may be specified at or before associating the at least one or more authentication factors with the communication channel.

Upon successful authentication, an instruction may be issued to a transaction processing module of another computer system.

Upon a predetermined number of unsuccessful authentications, the transaction is marked as suspicious.

In a further aspect, there is provided a non-transitory computer readable medium storing instructions that when executed by a processor cause the processor to:

store in a memory store coupled to the processor an association between at least one authentication factor for an entity and a specified communication channel having an endpoint accessible to the entity, send a message from a communications module coupled to the processor over the specified communication channel to the endpoint, wherein the message includes or is updated to include indicia indicating authentication is required, receive information for comparison with the at least one authentication factor for the entity associated with the specified communication channel; and authorising the transaction by an authentication module in communication with the processor in response to determining the stored at least one authentication factor for the entity associated with the specified communications channel matches the information provided from the endpoint.

A non-transitory computer readable medium storing instructions that when executed by a processor cause the processor to:

receive at an endpoint via a specified communication channel a message from a communications module coupled to a processor, wherein the message includes or is updated to include indicia indicating authentication is required, provide to an authentication module at least one authentication factor for authorising of a transaction by the processor upon determining that a stored at least one authentication factor associated with the endpoint of a specified communications channel matches the information provided from the endpoint to the authentication module.

(Optionally, the entity may have exclusive access to the endpoint (e.g. non shared email, non-shared telephone), or may have a number of people accessing (e.g. shared email address, shared website link).

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings.

Understanding that these drawings depict only exemplary embodiments of the disclosure and are not therefore to be considered to be limiting of its scope, the principles herein are described and explained with additional specificity and detail through the use of the accompanying drawings.

Figure 1:
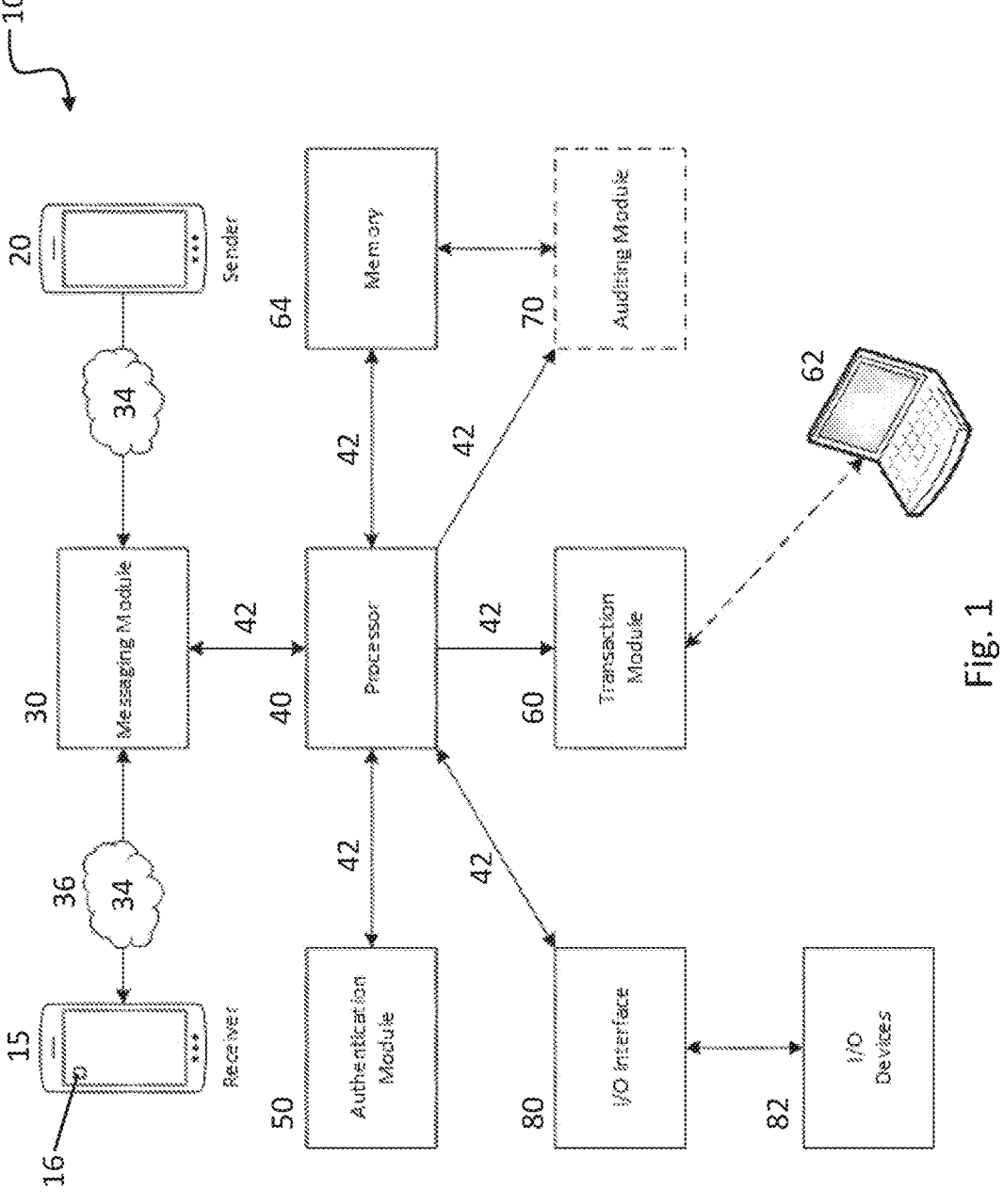

Preferred embodiments of the present disclosure will be explained in further detail below by way of examples and with reference to the accompanying drawings, in which:

FIG. 1 depicts an exemplary system architecture for an embodiment of the present disclosure.

Figure 2:
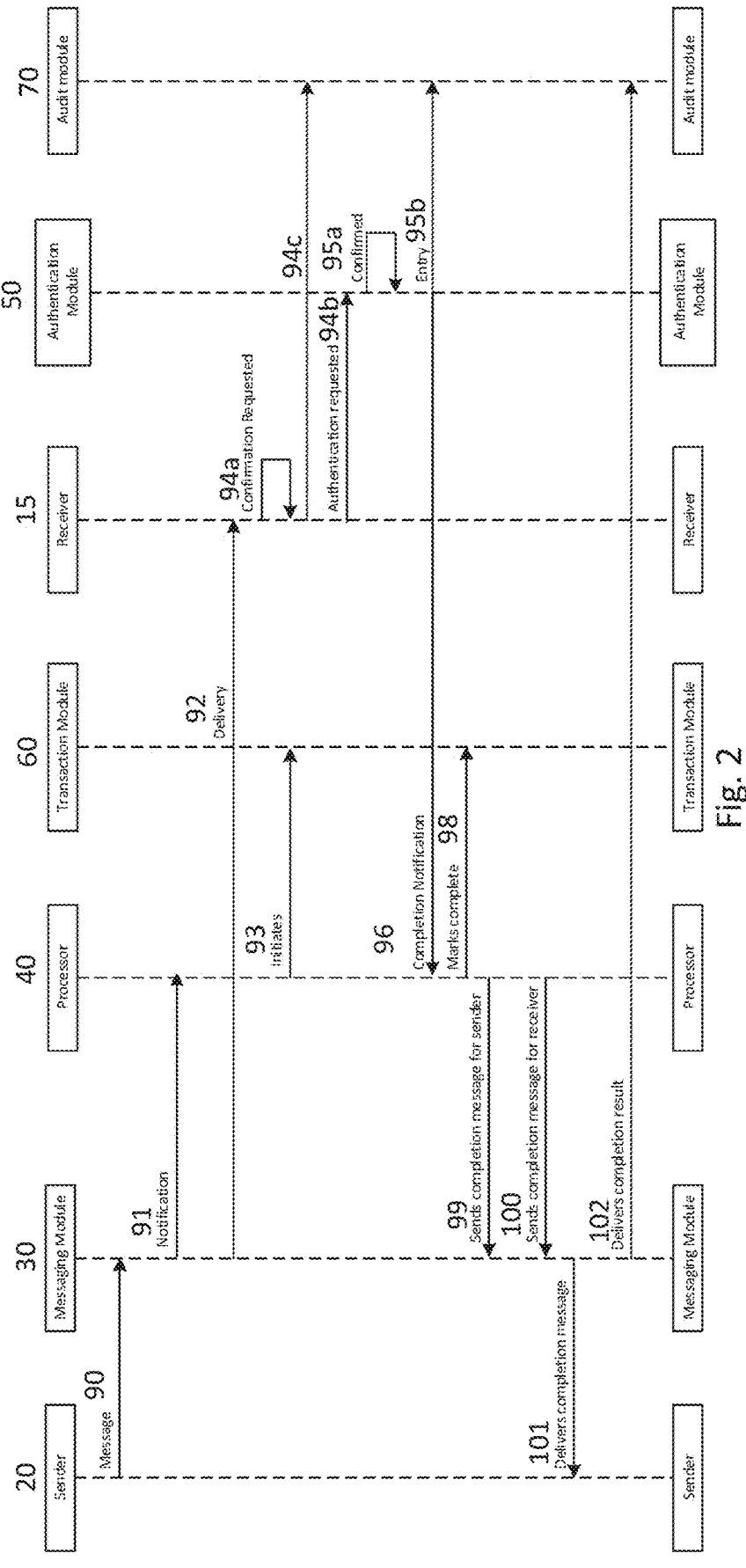

FIG. 2 depicts an exemplary sequence diagram for the embodiment of the system depicted in FIG. 1.

Figure 3:
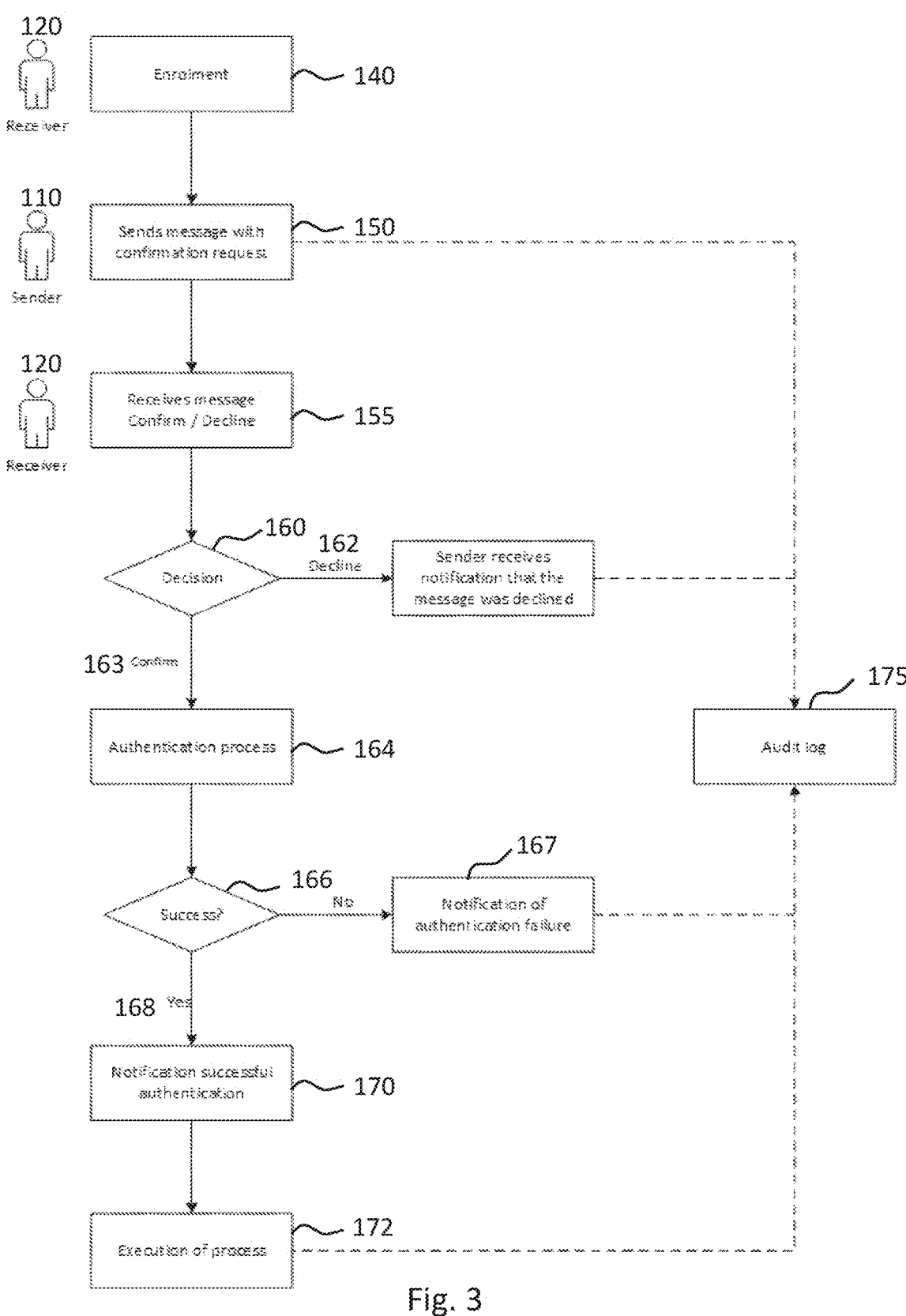

FIG. 3 depicts a schematic representation of the various steps in an exemplary user experience.

Figure 4:
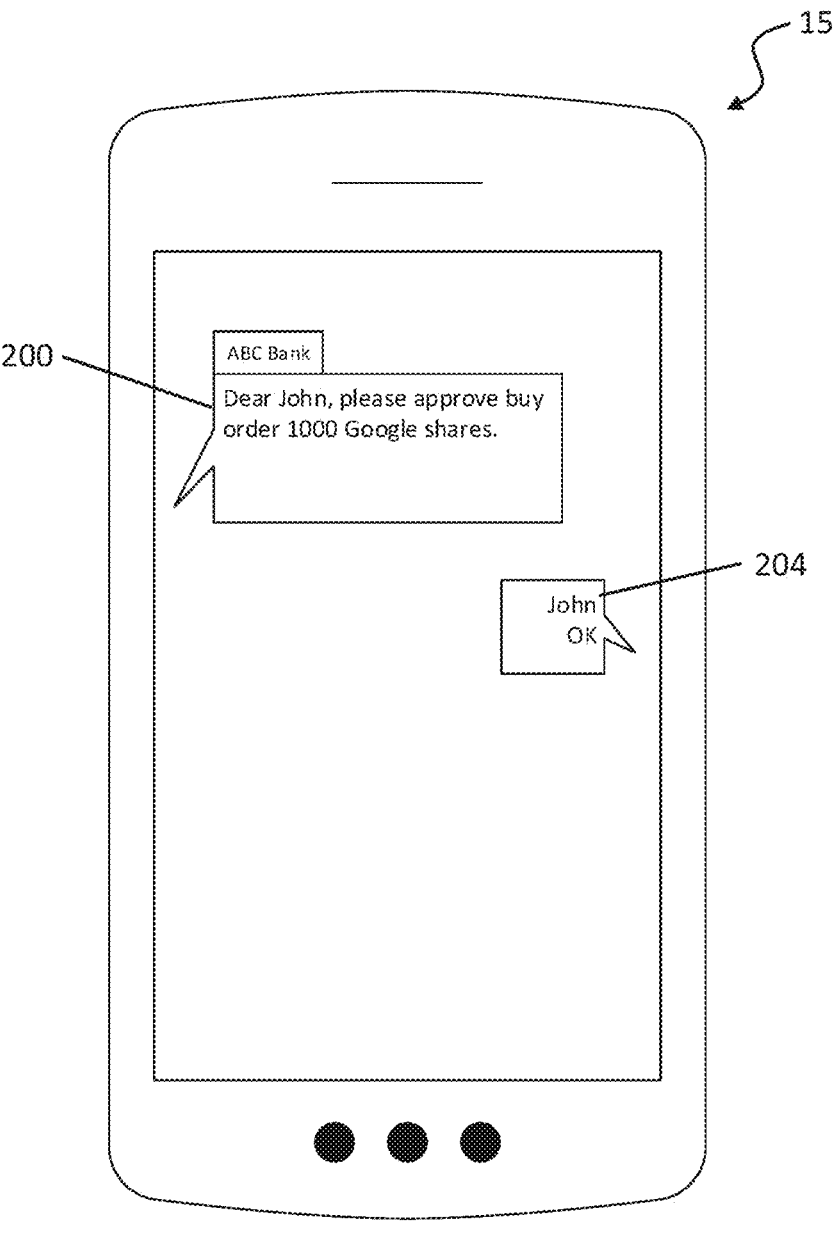

FIG. 4 depicts an exemplary representation of a portable electronic device of the prior art, in which an exemplary message requesting authorisation has been received.

Figure 5A:
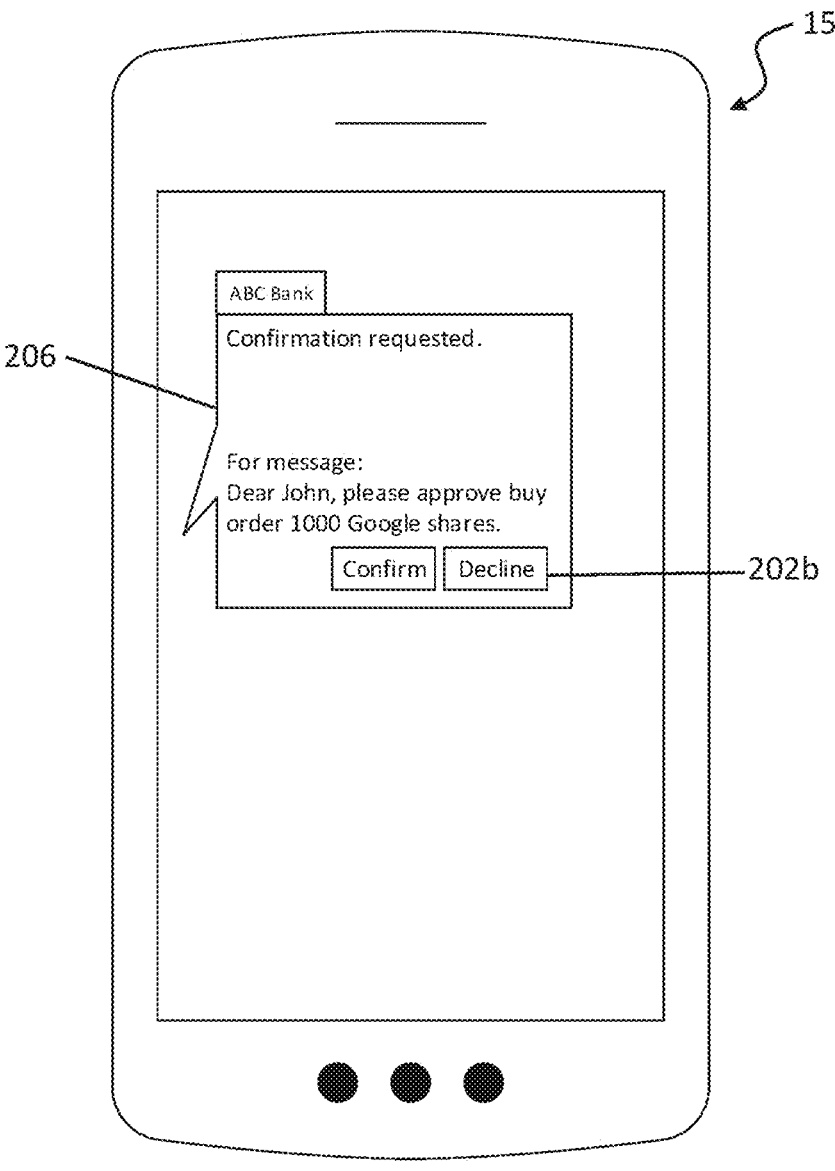

FIG. 5A depicts an exemplary representation of a portable electronic device according to the embodiment of the present disclosure depicted in FIG. 1, wherein an exemplary message requesting authorisation channel has been received.

Figure 5B:
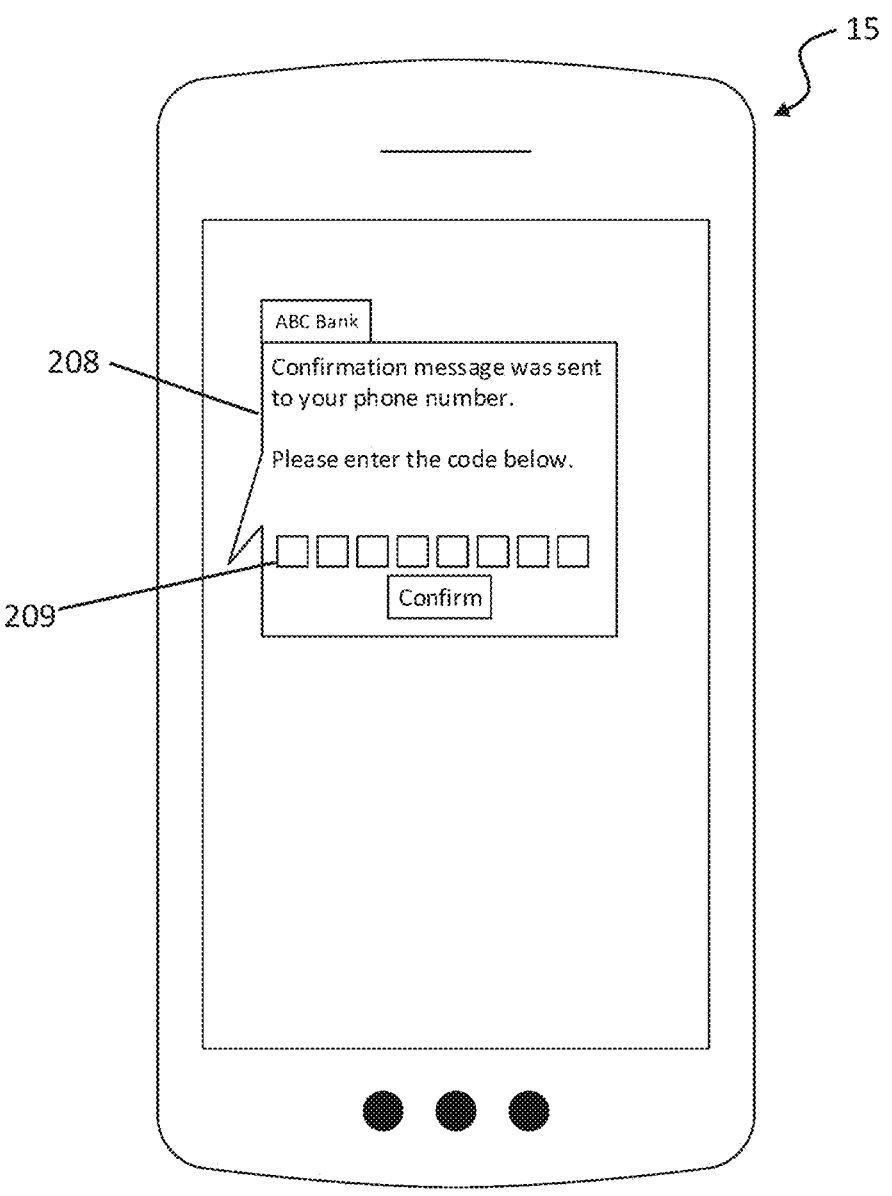

FIG. 5B depicts an exemplary representation of the portable electronic device of FIG. 5A on which an exemplary message requesting authorisation has been received.

Figure 5C:
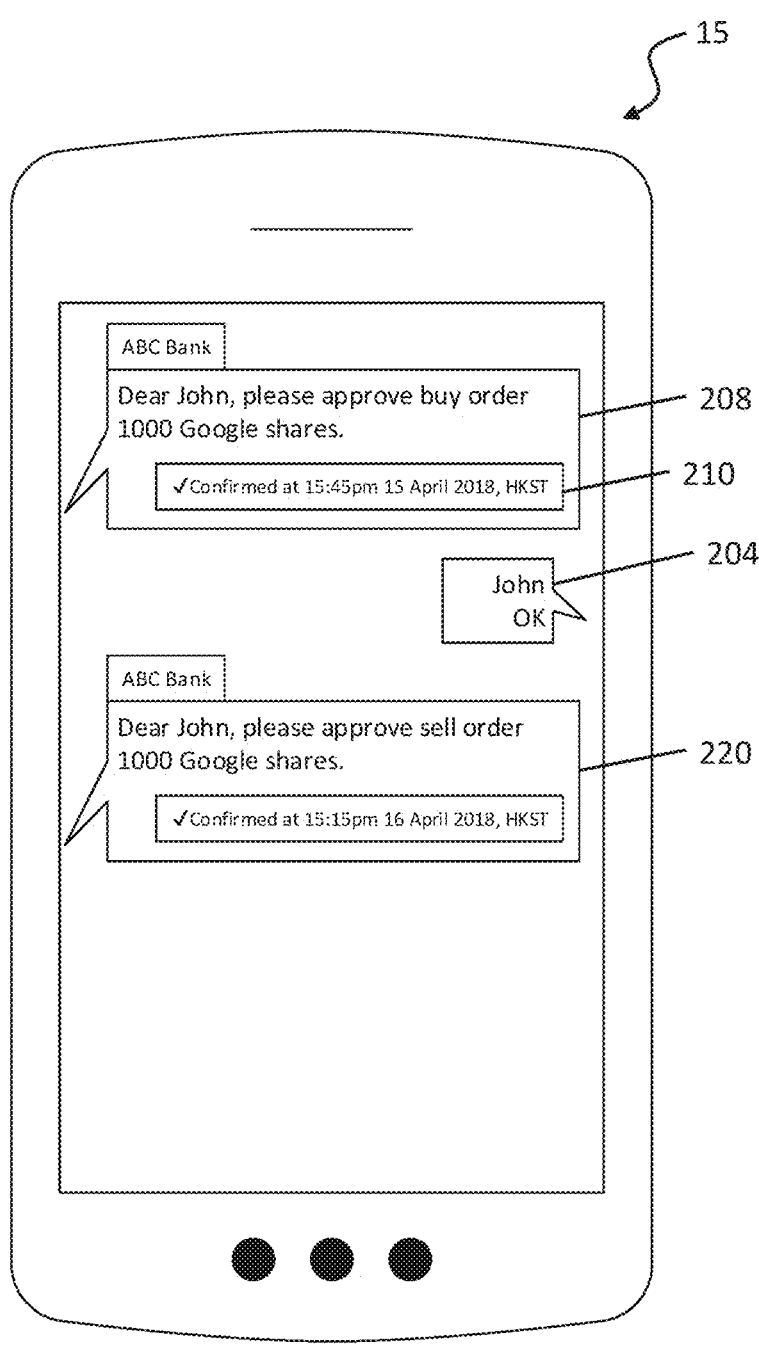

FIG. 5C depicts an exemplary representation of the portable electronic device of FIG. 5A on which an exemplary message requesting authorisation has been received.

Figure 5D:
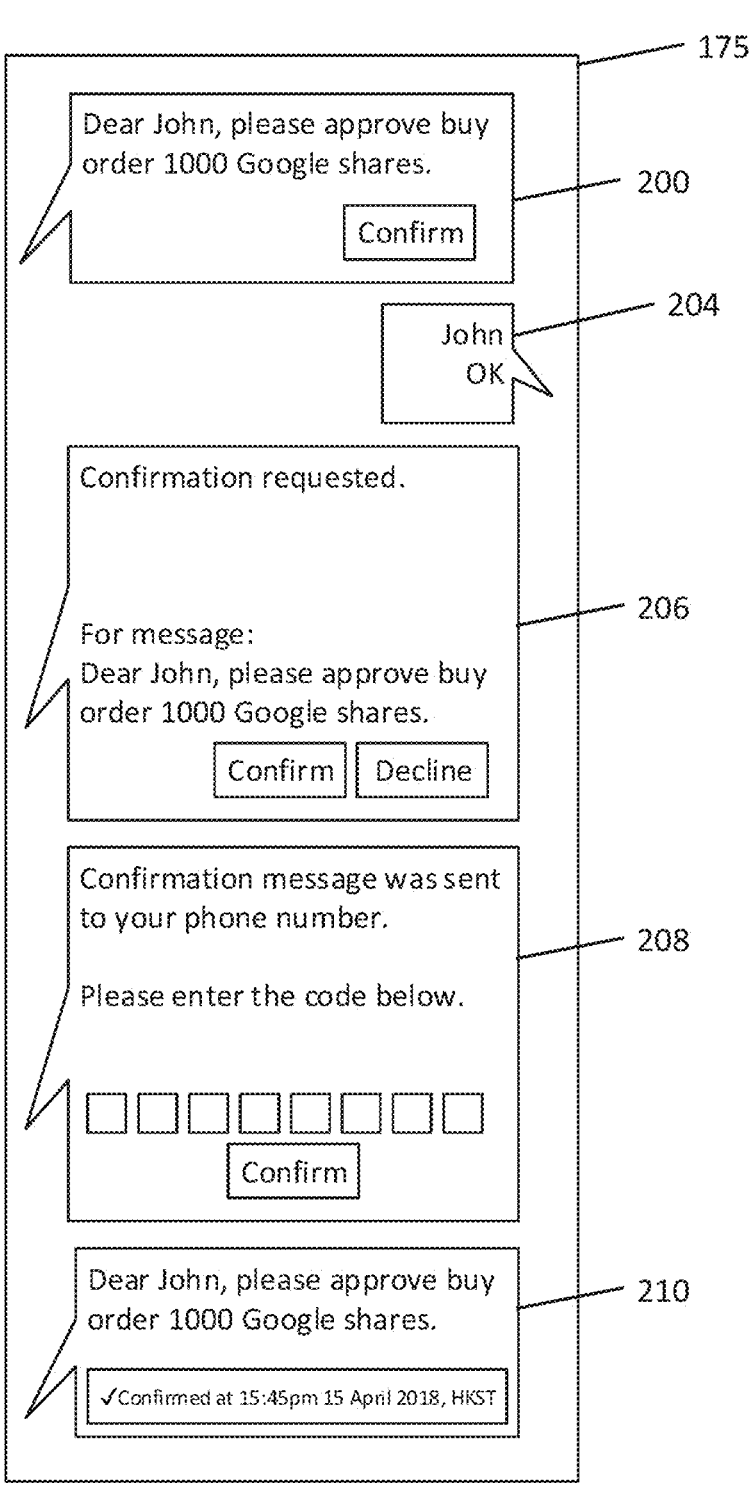

FIG. 5D depicts an exemplary representation of the portable electronic device of FIG. 5A on which an exemplary message requesting authorisation has been received.

DETAILED DESCRIPTION OF THE PREFERRED EMBODIMENTS

Various embodiments of the disclosure are discussed in detail below. While specific implementations are discussed, it should be understood that this is done for illustration purposes only. A person skilled in the relevant art will recognize that other components and configurations may be used without departing from the scope of the present disclosure.

In some embodiments there is disclosed a method and system for authorising a transaction over a communication channel of an entity having access to an endpoint of that channel based upon successful verification of authentication factors supplied by that entity.

Advantageously, this method and system allows an entity having access to a computer or communications device (such as a portable mobile phone, tablet, laptop or computer) to be contacted using a specified communications channel (such as email, WhatsApp, WeChat, Skype) and then to verify (over the same or another communications channel) they have authorised a specific transaction referenced in a message by supplying authentication factors which match those previously provided.

Optionally, the message and authorisation response may be captured by an auditing module, providing a chronological record of any ongoing communications, and including an indication for specific messages of the ongoing communication over that channel, where the entity associated with the endpoint of that channel has confirmed the message (and actions referenced therein).

As used herein, the term "indicia" may include any distinguishing marks, graphical, image, textual, aural or other means inserted, included or subsequently modified in the message for communicating to the operator of the endpoint of a communication channel the need for authentication.

Referring to the Figures, there is shown an exemplary environment 10 in which the method and system of the present disclosure may be operable.

As depicted in FIG. 1, a sending device 20 having an address may be connected via communication links to a messaging module 30 hosted on a server, which may be a cloud based server remote from the sending device 20 or hosted on-premises as a dedicated messaging server or a public Messaging-as-a-Platform (MaaP) service. The messaging module 30 is connected to a processor 40 via one or more communication bus lines 42, or some other wired or wireless connection.

The messaging module 30 is in communication with a remotely located receiving/transmitting device 15, over a network 34 using any type of wired or wireless connection, using a variety of communication protocols (e.g. HTTP, TCP/IP, HTTPS) to communicate on one or more communication channels 36 as will be described in more detail below. In particular, it would be appreciated that the remotely located receiving/transmitting device 15 may be a mobile device with data communications via their service provider's network under a compatible data protocol such as LTE (Long Term Evolution), EDGE (Enhanced Data Rates for GSM Evolution), UMTS (Universal Mobile Telecommunications System), etc.

The remotely located receiving/transmitting device 15 may be any one of a personal computer, electronic mobile communications device (such as a smartphone), tablet, laptop or similar. Advantageously, a client application 16 may be installed on the remotely located receiving/messaging device 15 for communication with the messaging module 30 over the network 34 via the communication channel 36, and other communication channels.

In one embodiment the communication channel 36 may be established may be accessed by navigating to a website or other endpoint hosted at the messaging module 30 without departing from the present disclosure. In this case the messaging module may be configured for communicating with the remote receiving/messaging device 15 as a webserver, and as such the messaging module may include processor-executable instructions for generating, receiving and/or handling data requests in HTTP (Hypertext Transport Protocol), HTTPS (Secure HTTP), FTP (File Transfer Protocol), SSH (Secure Shell), RPC (Remote Procedure Call) and/or other data communication protocols.

Alternatively the communication channel between the endpoint of the user transmitting/receiving device 15 and the messaging module 30 may be established using an installed application on a mobile communications device without departing from the scope of the present disclosure. Separate communication channels for transmission may be established without departing from the scope of the present disclosure.

Typical applications include a variety of software applications which may be supported on a variety of platforms including iPhone, Android, Blackberry, which may be executed on the respective operating systems. It would be appreciated that a user or entity operating the endpoint (for example an instant messaging application) of a communication channel can exchange messages with a corresponding communication module or instance configured to interact with that application over the network.

In the above embodiments the device may be identified as a unique endpoint by a unique identifier. Illustrative identifiers include, but are not limited to, the device's IMEI (International Mobile Equipment Identity), ESN (Electronic Serial Number), IP (Internet Protocol) address or MAC (Medium Access Control) address, the user's IMSI (International Mobile Subscriber Identity) or TMSI (Temporary Mobile Subscriber Identity), email headers, UUID (unique ID), Serial ID etc.

Alternatively, it is possible in certain implementations that the physical endpoint is not unique, and may be for example a terminal in a cafe or airport location; and the user may access browser to check their email.

The system further comprises an authentication module 50 which may be a software module executing on the processor, or a separate computer. The authentication module 50 is configured for verifying information supplied over communication channel 36 to the messaging module 30 against identification information supplied at the time of enrolment of the user of the receiving/transmitting device 15 as will be described in more detail below.

Optionally, the information may be supplied during the enrolment process from the same unique endpoint as where the information which is subsequently supplied and verified.

Alternatively, the endpoint used in the enrolment process and the supply of the initial information and the endpoint used in the subsequent supply of information may be different.

On successful verification of information supplied from the receiving/transmitting device over the communication channel 36 over the network 34 by the authentication module 50, an instruction may be issued to the transaction module 60 to proceed with processing a transaction. It would be appreciated that the transaction processing could be part of a separate system, such as an online broking account, tax account, trading account, bank account or similar configured which executes instructions once confirmation to proceed has been verified.

It would be appreciated that the transaction module 60 may or may not be part of the same computing system as the other components of the system. Alternatively, it would be appreciated that a further optional transaction processing module 62 may be included, configured for interfacing with the transaction module 60 of the present system over a network; with either or both of the transaction modules being owned and/or operated by another party.

A memory store 64 stores information and software for operation of the processor and various modules to perform the functions of the system described herein.

Optionally, there is also depicted an auditing module 70 in communication with the processor for capturing the messages transmitted between the sender, the messaging module 30 and the remote transmitting/receiving device 15; including information provided to the authentication module 50 from the receiving device over the communication channel 36 over the network 34 of the system.

Advantageously, this information may include time/date/geographic/origin/source identity information (for example). This auditing module may be configured separate from and with limited access as compared to the other parts of the system, for providing an independent and accurate record of messages communication and verification performed thereof in relation to communications from an operator of the remote transmitting/receiving device 15.

There is also provided an Input/output Interface 80 configured for receiving various commands from input/output devices 82 such as mice, keyboard, touch screen and the like for maintaining and controlling the operation of the system.

It would be appreciated that the modules described herein may be an aggregation of computers which perform the various functions described, with such functions distributed amongst and between hardware and/or software resources, including one or more processors and memory and additional hardware and/or software resources without departing from the present disclosure.

Referring now to FIG. 2, there is depicted an exemplary sequence diagram for interaction with the embodiment of the system depicted in FIG. 1. (This sequence assumes that the recipient has enrolled in the platform, details of which are discussed below).

As shown a sender 20 creates the text for a particular message for which they require confirmation (step 90). This message is passed to the messaging module. The messaging module 30 then passes the message to the processor in the form of a notification (step 91) and to the receiving/transmitting device 15 over the communications network (step 92).

The processor 40 may initiate a new possible transaction (step 93) in a software or hardware executing in the transaction module 60.

The operator of the receiving transmitting device 15 then receives the message which may include indicia indicating that confirmation of the message and the identity of the recipient has been requested (step 94*a*). Alternatively, it would be appreciated that the message could be updated after receipt with the relevant indicia visibly indicating to the entity accessing the endpoint that authentication is required.

Upon depression or actuation of the indicia, the necessary confirmation may be provided by the receiver to the authentication module 50 (step 94*b*) as is discussed in more detail below.

As the verification has been performed at the authentication module 50 in step 95*a*, a completion notification (96) may be then transmitted back to the processor 40. Optionally, an entry in an audit module may also be made, indicating that authentication has successfully been performed (step 95*b*).

The processor 40 then determines that that communication has been completed and passes a message to the transaction module 60 (step 98), and at the same time, a completion message may be transmitted from the processor to the messaging module indicating that successful completion should be indicated to both the sender (step 99) and receiver (step 100). A completion message may then be delivered by the messaging module 30 to the sender 20 and the receiving/transmitting unit over the communication channel 36 of the network 34 (steps 101).

Optionally, an entry in an audit module may also be made, with the same message (step 102).

FIG. 3 depicts an exemplary schematic flowchart showing the graphical experience at the user interface side by a user according to the embodiment of the system depicted in FIG. 1.

Referring now to FIG. 3, there is shown a person or entity 120 who has a receiving and transmitting device 15. Authentication factors such as biometric data, passcode data or other appropriate authentication factors may be provided by the operator of the receiving/transmitting device to an authentication module of the system during the enrolment in such system at step 140.

As is known in the art, such authentication factors may be something known to the user (e.g. a password, passcode, or secret phrase), something inherent to the user (biometric characteristic such as a fingerprint, voiceprint or iris pattern), or something possessed (e.g. the endpoint device, a hardware token device such as a Yubikey or similar) and these may be used in the system in single factor, two factor or multiple factor authentication. It would be appreciated that an application may be configured to generate a code based of a digest of a system time; or an authentication code may be supplied as a One-Time-Password over the same or different communication channel to the entity accessing an endpoint.

When a sender 110 needs to obtain authorization of a transaction from the person or entity operating a receiving or transmitting device over a communication channel, the sender may choose to send a message at step 150 with a confirmation message or indicia therein, which is then received by the receiver at step 155.

It would be appreciated by a person skilled in the art that the message and the confirmation indicia could be sent in the same or subsequent messages without departing from the scope of the present disclosure.

The recipient of the message operating the communication channel 36 over the network 34 on the receiving/transmitting device 15 can then at step 160 choose to confirm or decline (that is authorize) the specific transaction.

Assuming that the recipient and operator of the receiving/transmitting device 15 chooses to decline to authorize a specific message, the sender may receive at step 162 notification that the message was declined.

Alternatively, if the recipient and operator of the communication channel 36 on the receiving/transmitting device 15, is minded to confirm the transaction, an indicia or other way of initiating the provision of authentication factors may be activated by the user at step 163.

At step 164, an authentication process is conducted.

If there is an authentication failure at 166 this may be communicated to the user and/or stored in an audit log at step 167.

Alternatively, if successful authentication has occurred at 168, notification of successful authentication may be provided at step 170 to the operator of the communication channel by any means, including over the established communications channel 36 or another communications channel (not shown) implemented on the network 34 to which the receiving and transmitting device 15 may be connected.

Accordingly, at step 172, the successful authentication of the identity of the operator may be sufficient to authorize the performance of one or more transactions as described above.

Optionally, it would be appreciated that the various steps of this process may be included in an audit log 175 by an auditing module 70 for providing a transcript of the communication/authentication processes which have been undertaken.

It would be appreciated that the above is an exemplary embodiment only of the graphical user interface interactions, and a variety of modifications could be performed without departing from the scope of the present disclosure. For example, the indicia which indicate that authentication of a message is required may be presented in a number of forms, which may be used to draw the attention of the user to the need for authentication. It would be appreciated that this indicia may be replaced or updated to reflect the outcome of the authentication process which has occurred.

This update/replacement may be performed by the same or different communications channel used for transmission of the request for authorisation, or response back from an endpoint with authentication factors to be verified.

The inclusion of an optional audit log 175 by an audit module 70 enable compliance with regulatory and other requirements and facilitates good record keeping of the transaction.

During the operation, the authentication factors provided by the operator of the receiving/transmission device may be provided over the same communication channel which is specified when the authentication factors are provided by the operator to the system when enrolling said user.

It would be appreciated that the communications channel 36 may be used for the messages transmitted from the sender, the messaging module 30 and the remote transmitting/receiving device 15; and the same communications channel 36 may be used for messages received by the messaging module 30 from the remote receiving device. Alternatively, a communications channel 36 may be used to receive from the remote transmitting/receiving device 15 which is different to the communications channel used to send the messages to the remote transmitting/receiving device 15.

For example; it could be envisaged that a user could set up an association between their WhatsApp number, email address and authentication factor(s) which is stored on a computer system.

A message requiring authentication could be sent to a user's WhatsApp number on a smart telephone such as an Apple™ iPhone®; and the user responds by sending back one or more authentication factors via email from their (previously enrolled) email address to the computer system for verification. If this verification is successful, the WhatsApp message could be marked by indicia to confirm successful verification via the WhatsApp communications channel (or via a different channel).

Optionally, the entity may have exclusive control over the access to the endpoint (e.g. non shared email, non-shared telephone), or may have a number of people accessing (e.g. shared email address, shared website link.

Referring now to FIG. 4, there is depicted an exemplary representation of a typical user experience for current authorisation techniques. The remote receiving and transmitting device is shown with the screen of a particular application which may be an instant messaging application display.

It can be seen that there is a message 200 from ABC Bank requesting confirmation of an order to purchase 1,000 Google shares.

John (someone who has John's device; or someone who is pretending to be John with the device) has written back in message shown at 204 a short text message OK purporting to authorise the transaction.

However, as will be appreciated, this is not really strong or sufficient verification that John's mobile device 15 has not been lost or otherwise had its identity assumed by a rogue third party. Hence, further confirmation is required.

According to an aspect of an embodiment of the present disclosure the message may take the form of that depicted in exemplary representation in FIG. 5A as message 206 from ABC Bank including the CONFIRM and DECLINE buttons 202b. Optionally, other graphical, textual, image or other indicia may be used to communicate the need for authentication of the message to the user without departing from the scope of the present disclosure.

Optionally, the indicia indicating that authentication is required may be configured so that the indicia itself is actuable (for example by touching it on a touch screen device, or selecting it with a mouse on a computer), to trigger the authentication information to be transmitted from the device to the communications module of the system using the same channel over which the message was transmitted, or via a different but previously specified communication channel (from the specified endpoint). In such an embodiment, the authentication factors may be stored into the device, and supplied at the time at which the association between the endpoint, the communication channel, and the authentication factors is created.

Assuming that the CONFIRM button is selected by the user, and referring now to FIG. 5B, there is a further message from ABC Bank indicating at 208 the space for the inclusion of a one-time passcode, or other appropriate authentication factor or factors as discussed above. (This step would not be required if the authentication factor preconfigured for this type of message has already been transmitted e.g. by user actuation of the indicia).

It would be appreciated that in the application shown in FIG. 5B, this one-time passcode may be sent by a communication channel other than the communication channel on which the application is executing. For example, persons skilled in the art would appreciate that this communication channel may be a short message service (SMS), messaging application (including an instant messaging application), or a type of communication, sent to the personal communication device 15 by some other means.

The user may provide this information by answering the one-time passcode in the boxes marked as 209, and pressing the CONFIRM button.

Referring now to FIG. 5C, the history and confirmation of the date and time at which this order was confirmed using the one-time password is shown in the date and time stamp at 210 in the message 208.

Advantageously, and optionally, the original message from John "OK" which is insufficient for authentication may also be shown.

It would be appreciated that a further message, with similar verification 220 may also be shown subsequent to this transaction further or additional authentication would be performed to confirm the authentication factors supplied by the user for this message, similarly as is the case shown from FIGS. 5A to 5C.

Finally, referring to FIG. 5D, there is depicted an exemplary transcript of the approval process which may be captured by an audit log 175, performed by an audit module of the system 70 for regulatory purposes.

The various message in the conversation can be seen, starting from the initial aspects of the transaction running through to the final confirmation.

Advantageously, it would be appreciated that the endpoint of the communication which the user is able to access may be identified by any means of identification which is unique capable. Advantageously, exemplary endpoints may be selected from a group including a telephone number, an email address, an instant messaging address, or other similar such identified endpoints as discussed above.

In the exemplary embodiment depicted in FIGS. 5A to 5D, the transaction may include the display of indicia such as a green confirmation button shown in the Figures indicating that the message has been successfully authenticated. It would be appreciated that a variety of indicia would be able to be used, and such indicia are not be limited to the form depicted or described.

Optionally, the indicia used for depicting a successful authentication may be a modified version of the initial indicia indicating an authentication was required which was included with or updated in the message transmitted.

Advantageously, the information stored by the auditing module 70 in the audit log 75 may be selected from a group of information types including the time of transaction, time of receipt, identification of originating device, identification of destination device and/or geographic location information, user identifier, type of mechanism used for confirmation and mechanism specific information.

Optionally, it would also be appreciated that it may be necessary for multiple authentications to be conducted, for example, where a transaction amount exceeds certain system specified, or user specified amounts or levels. Other parameters that may require multiple authentications for the same transaction may be configured to include the time between authentications, the delay between the initial request for authentication and the provision of authentication information or any other such pre-determined criteria.

The specified transaction parameters may be determined as noted above by the user at the time of association of the authentication factors and the unique endpoint, or maybe system specified in accordance with risk management policies of the organization.

It would be further appreciated that upon the successful authentication of a message authorized a particular transaction, the confirmation to proceed with that transaction may be executed within the system of the present disclosure, or passed over a communications network or via some other means to a further transaction processor, for example, a bank or stock exchange for execution on their service. It would be appreciated that there is no limit as to the type of further transaction which may be conducted according to instructions issued after a successful authentication.

An individual at the time of enrolment into the system may provide multiple communication channels (for example, email addresses, email headers, system messaging applications) defined by endpoints by which a particular device could communicate with the messaging module 30. It would be appreciated that the communication channel, endpoints, and the authentication factors required for certain types of transactions could be uniquely specified amongst such multiple applications, or according to certain pre-determined criteria, without limiting the present disclosure.

It may be sufficient that a particular type of endpoint is specified, for example using a browser when creating the association between a communication channel, a particular user or entity, and their authentication factors.

Alternatively, for more security, the system and method of the present disclosure may specify a unique endpoint (identified by one or more identification factors) which is included in the association created between a communication channel, a particular user, and their authentication factors.

Advantageously, for higher security and for more sensitive transactions the system may be configured such that access to the specified endpoint is exclusively under physical access control by a specific entity, for example in the case of a smartphone in a pocket of a user, accessible (in theory) to only that specific user after unlocking the telephone with a pin code, thumbprint or other type of biometric or access control information (e.g. a device such as a smartphone).

However, it is envisaged that the system of the present disclosure could still work in a situation where the endpoint is not under the exclusive control of a specific entity. As with the embodiment where the endpoint is under the exclusive control of an entity, the authentication factors for the specific entity, endpoint and communication channel are specified in advance to establish the trusted identity against which subsequent verification can be undertaken. An assessment of the nature of the transaction which is to be authorised, and the relative risk of compromise to the authentication factors provided could be used to determine for which types of transactions this embodiment may be suitable, as it may not provide the same level of security as the embodiments in which the end point is exclusively accessible to the entity.

For example, a broker for high net worth individuals may create a link to a particular website, and then send an email with a link to all target clients to go this website and click on link to authorise the purchase of 500 shares of a particular stock on their behalf (at say US$1 per share). Previously clients may have provided authentication factors (e.g. a picture) and confirmed that for amounts less than 1000 USD, a link on a particular website may be activated; and an image will be captured shortly after activating the link by a camera of the computer and compared against the previously supplied image.

Accordingly, when receiving this particular link customers who respond to this link at any PC may click on the link, activating an attached camera, which takes a picture; this picture then being verified against the picture supplied at the time of enrolment.

Alternatively, the same broker for high net worth individuals may send to email addresses of specific clients a request to authorise the purchase of 1500 shares of a particular stock on their behalf (at say US$1 per share). Previously clients may have provided authentication factors (e.g. biometric voice print data of an agreed phrase) and confirmed that for amounts greater than 1,000 USD but less than 10, 000 USD, verification by supplying the agreed phrase by email attaching a voiceprint may be required.

Accordingly, after accessing the email address (which is presumably under the exclusive control of the High Net Worth Individual), biometric voice print data of an agreed phrase may be supplied, optionally by email or via another application; depend on the arrangement specified at the time of provision of the authentication factors.

Accordingly, the present disclosure provides a unique environment in which to manage and confirm authorization of particular transactions.

By enabling enrolment of certain authentication factors and association of such factors with outgoing (and potentially also receiving) specified communication channels, subsequent verification and authentication that the user of the device is the same person as the person enrolling that device can be performed.

It would be appreciated that finance industry requirements (arising from risk management and regulatory oversight) can be complied with using the system of the present disclosure, allowing traceability of instructions sent by messaging, including instant messaging, and at the same time providing a strong assurance of the identity of the authorizing party by employing advances in modern technologies for verification of individual identities.

It would further be appreciated that in the event of a failed authentication, or a predetermined number of failed authentications, that the transaction could be flagged for further investigation, including follow up with compliance offices of the institution with the operator of the transmitting/receiving device 15.

The above embodiments are described by way of example only. Many variations are possible without departing from the scope of the disclosure as defined in the appended claims.

For clarity of explanation, in some instances the present technology may be presented as including individual functional blocks including functional blocks comprising devices, device components, steps or routines in a method embodied in software, or combinations of hardware and software. Furthermore, the environment in which some embodiments of the disclosure are implemented may incorporate a general purpose computing environment and/or a special purpose device such as a portable communication device.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, Universal Serial Bus (USB) devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method of authorising a transaction over a communication channel comprising:

storing in a computer system a plurality of associations for an entity, wherein each stored association comprises:

at least one authentication factor for the entity; and a specified communication channel of a plurality of communication channels having an endpoint accessible to the entity;

selecting, based on at least one parameter of a proposed transaction, a stored association of the plurality of stored associations, the selected association corresponding to the at least one parameter of the proposed transaction;

displaying, on a display of an electronic device, a messaging thread in a messaging graphical user interface associated with a specified communication channel of the selected association, wherein the messaging thread comprises a first message to the entity indicative of a proposed transaction;

receiving at the computer system, via the specified communication channel of the selected association, an indication that the entity approves the proposed transaction;

determining, based on the selected association and the first message, at least one authentication factor corresponding to the selected association;

updating, on the display of the electronic device, the messaging thread displayed on the messaging graphical user interface associated with the specified communication channel of the selected association, wherein the updated messaging thread further comprises a second message indicating authentication is required and a user interface control for enabling the entity to authenticate the proposed transaction;

receiving at the computer system, via the specified communication channel of the selected association, information for comparison with the at least one authentication factor for the entity associated with the specified communication channel of the selected association;

authorising the transaction by one or more processors of the computer system in response to determining that the stored at least one authentication factor for the entity associated with the specified communication channel of the selected association matches the information;

updating, on the display of the electronic device, the messaging thread displayed on the messaging graphical user interface associated with the specified communication channel of the selected association, wherein the updated messaging thread further comprises a confirmation of the authorization and the time at which the transaction was authorized; and storing, in an audit log, a record of the transaction comprising the first message indicative of the proposed transaction, the at least one parameter of the proposed transaction, the confirmation of the authorization, and the time at which the transaction was authorized.

2. The method of authorising a transaction over a communication channel according to claim 1 wherein the access to the endpoint of the communication channel is controlled so as to be accessible only by the entity.

3. The method of authorising a transaction over a communication channel according to claim 2 wherein the unique endpoint of the communication channel is selected from the group comprising a telephone number, an email address, an instant messaging address, IMEI (International Mobile Equipment Identity) number, ESN (Electronic Serial Number), IP address (Internet Protocol) or MAC address (Medium Access Control), Universal Unique Identifier (UUID), and Serial Identification Number.

4. The method of authorising a transaction over a communications channel according to claim 1 wherein the communications channel is selected from the group comprising an email system, a messaging application, and a Short Message Service application.

5. The method of authorising a transaction according to claim 1 wherein the message indicating that authentication is required is configured such that upon actuation of the message, information for comparison with the at least one authentication factor for the entity associated with the specified communication channel is transmitted.

6. The method of authorising a transaction according to claim 1 wherein the confirmation of the authorization is a modified version of the message indicating authentication is required.

7. The method of authorising a transaction according to claim 1 wherein messages transmitted on said communication channel and authentications thereof are stored in the audit log.

8. The method of authorising a transaction according to claim 7 wherein the messages stored in the audit log further include one or more of information for messages transmitted thereon selected from the group comprising time of transmission, time of receipt, identification of origin, identification of destination, and geographic location information.

9. The method of authorising a transaction according to claim 1 wherein a plurality of authentications are performed with respect to the same transaction in accordance with predetermined criteria.

10. The method of authorising a transaction according to claim 9 wherein a plurality of authentications are performed for the same transaction wherein the predetermined criteria are specified transaction limits.

11. The method of authorising a transaction according to claim 9 wherein the predetermined criteria are specified at or before associating the at least one or more authentication factors with the communication channel.

12. The method of authorising a transaction according to claim 1 wherein upon successful authentication, an instruction is issued to another computer system.

13. The method of authorising a transaction according to claim 1 wherein upon a predetermined number of unsuccessful authentications, the transaction is marked as suspicious.

14. A system for authorising a transaction over a communication channel comprising:

a memory store of a computer system configured for storing a plurality of associations for an entity, wherein each stored association comprises:

at least one authentication factor for the entity; and a specified communication channel of a plurality of communication channels having an endpoint accessible to the entity;

one or more processors configured for:

selecting, based on at least one parameter of a proposed transaction, a stored association of the plurality of stored associations, the selected association corresponding to the at least one parameter of the proposed transaction;

displaying, on a display of an electronic device, a messaging thread in a messaging graphical user interface associated with a specified communication channel of the selected association, wherein the messaging thread comprises a first message to the entity indicative of a proposed transaction;

receiving, via the specified communication channel of the selected association, an indication that the entity approves the proposed transaction;

determining, based on the selected association and the first message, at least one authentication factor corresponding to the selected association;

updating, on the display of the electronic device, the messaging thread displayed on the messaging graphical user interface associated with the specified communication channel of the selected association, wherein the updated messaging thread further comprises a second message indicating authentication is required and a user interface control for enabling the entity to authenticate the proposed transaction;

receiving, via the specified communication channel of the selected association, information for comparison with the at least one authentication factor for the entity associated with the specified communication channel of the selected association from the endpoint;

authorising the transaction if the stored at least one authentication factor for the entity associated with the specified communication channel of the selected association matches the information;

updating, on the display of the electronic device, the messaging thread displayed on the messaging graphical user interface associated with the specified communication channel of the selected association, wherein the updated messaging thread further comprises a confirmation of the authorization and the time at which the transaction was authorized; and storing, in an audit log, a record of the transaction comprising the first message indicative of the proposed transaction, the at least one parameter of the proposed transaction, the confirmation of the authorization, and the time at which the transaction was authorized.

15. The system for authorising a transaction over a communication channel according to claim 14 wherein the access to the endpoint of the communication channel is controlled so as to be accessible only to the entity.

16. The system for authorising a transaction over a communication channel according to claim 15 wherein the unique endpoint of the communication channel is selected from the group comprising a telephone number, an email address, an instant messaging address, IMEI (International Mobile Equipment Identity) number, ESN (Electronic Serial Number), IP (Internet Protocol) address or MAC (Medium Access Control) address, Universal Unique Identifier (UUID), and Serial Identification Number.

17. The system for authorising a transaction over a communications channel according to claim 16 wherein the communications channel is selected from the group comprising an email system, a messaging application, and a Short Message Service application.

18. The system of authorising a transaction according to claim 14 wherein the confirmation of the authorization is a modified version of the message indicating authentication is required.

19. The system for authorising a transaction according to claim 14 wherein the one or more processors are configured to store messages transmitted on said communication channel and authentications thereof in the audit log.

20. The system for authorising a transaction according to claim 19 wherein the audit log is configured for storing information for messages transmitted on the communication channel wherein the information is selected from the group comprising time of transmission, time of receipt, identification of origin, identification of destination, and geographic location information.

21. The system for authorising a transaction according to claim 14 wherein the one or more processors are configured to perform a plurality of authentications with respect to the same transaction in accordance with predetermined criteria.

22. The system for authorising a transaction according to claim 21 wherein the one or more processors are configured to perform a plurality of authentications for the same transaction wherein the predetermined criteria are transaction limits.

23. The system for authorising a transaction according to claim 22 wherein the predetermined criteria are specified at or before associating the at least one or more authentication factors with the communication channel.

24. The system for authorising a transaction according to claim 14 wherein upon successful authentication, an instruction is issued to another computer system.

25. The system for authorising a transaction according to claim 14 wherein upon a predetermined number of unsuccessful authentications, the transaction is marked as suspicious.

26. A non-transitory computer readable medium storing instructions that when executed by a processor cause the processor to:

store in a memory store coupled to the processor a plurality of associations for an entity, wherein each stored association comprises:

at least one authentication factor for the entity; and a specified communication channel of a plurality of communication channels having an endpoint accessible to the entity;

display, on a display of an electronic device, a messaging thread in a messaging graphical user interface associated with a specified communication channel of the selected association, wherein the messaging thread comprises a first message to the entity indicative of a proposed transaction;

receive, via the specified communication channel of the selected association, an indication that the entity approves the proposed transaction;

determine, based on the selected association and the first message, at least one authentication factor corresponding to the selected association;

update, on the display of the electronic device, the messaging thread displayed on the messaging graphical user interface associated with the specified communication channel of the selected association, wherein the updated messaging thread further comprises a second message indicating authentication is required and a user interface control for enabling the entity to authenticate the proposed transaction;

receive, via the specified communication channel of the selected association, information for comparison with the at least one authentication factor for the entity associated with the specified communication channel of the selected association;

authorise the transaction by the processor in response to determining the stored at least one authentication factor for the entity associated with the specified communication channel of the selected association matches the information;

update, on the display of the electronic device, the messaging thread displayed on the messaging graphical user interface associated with the specified communication channel of the selected association, wherein the updated messaging thread further comprises a confirmation of the authorization and the time at which the transaction was authorized; and store, in an audit log, a record of the transaction comprising the first message indicative of the proposed transaction, the at least one parameter of the proposed transaction, the confirmation of the authorization, and the time at which the transaction was authorized.

* * * * *